US012299169B2

(12) United States Patent
Van Dyne et al.

(10) Patent No.: US 12,299,169 B2
(45) Date of Patent: May 13, 2025

(54) DYNAMIC MANAGEMENT OF DATA WITH CONTEXT-BASED PROCESSING

(71) Applicant: Microsoft Technology Licensing, LLC, Redmond, WA (US)

(72) Inventors: Colette Van Dyne, Bothell, WA (US); Jeffrey Friedberg, Woodinville, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 18/360,624

(22) Filed: Jul. 27, 2023

(65) Prior Publication Data
US 2024/0054245 A1 Feb. 15, 2024

Related U.S. Application Data

(63) Continuation of application No. 16/933,482, filed on Jul. 20, 2020, now Pat. No. 11,755,770, which is a
(Continued)

(51) Int. Cl.
*G06F 21/62* (2013.01)
*G06F 16/23* (2019.01)
(Continued)

(52) U.S. Cl.
CPC ...... *G06F 21/6245* (2013.01); *G06F 16/2372* (2019.01); *G06F 16/2457* (2019.01); *G06F 16/24575* (2019.01); *H04L 63/20* (2013.01)

(58) Field of Classification Search
CPC .... G06F 21/606; G06F 21/62; G06F 21/6245; G06F 21/2372; G06F 21/24575; G06F 21/2457; H04L 63/20
See application file for complete search history.

(56) References Cited

U.S. PATENT DOCUMENTS 10,169,608 B2 1/2019 Van Dyne et al.
10,719,625 B2 7/2020 Van Dyne et al.
(Continued)

OTHER PUBLICATIONS

Notice of Allowance received in Chinese Patent Application No. 201780029387.5, mailed on Jan. 10, 2022, 3 Pages. (English Translation provided).
(Continued)

*Primary Examiner* — Paul E Callahan
(74) *Attorney, Agent, or Firm* — Ray Quinney & Nebeker; James Bullough

(57) ABSTRACT

Techniques for using contextual information to manage data that is subject to one or more data-handling requirements are described herein. In many instances, the techniques capture or depend upon the contextual information surrounding the creation and/or subsequent actions associated with the data. The contextual information may be updated as the data is handled in various manners. The contextual information may be used to identify data-handling requirements that are applicable to the data, such as regulations, standards, internal policies, business decisions, privacy obligations, security requirements, and so on. The techniques may analyze the contextual information at any time to provide responses regarding handling of the data to requests from requestors, such as administrators, applications, and others.

20 Claims, 4 Drawing Sheets

Related U.S. Application Data continuation of application No. 16/237,312, filed on Dec. 31, 2018, now Pat. No. 10,719,625, which is a continuation of application No. 15/154,811, filed on May 13, 2016, now Pat. No. 10,169,608.

(51) Int. Cl.
*G06F 16/2457* (2019.01)
*H04L 9/40* (2022.01)

(56) References Cited

U.S. PATENT DOCUMENTS

| | | |
|---|---|---|
| 10,963,579 B2 * | 3/2021 | Lemmey ............. G06F 21/6218 |
| 2007/0016625 A1 | 1/2007 | Berstis |
| 2007/0124375 A1 | 5/2007 | Vasudevan et al. |
| 2014/0096195 A1 * | 4/2014 | Morgan .................. G06F 21/43 |
| | | 726/4 |
| 2017/0199963 A1 | 7/2017 | Kondadadi et al. |

OTHER PUBLICATIONS

Office Action Issued in received in European Application No. 17724695.6, mailed on Oct. 5, 2022, 6 pages.

First Office Action Received for Chinese Application No. 202210234177.2, mailed on Dec. 20, 2024, 24 pages. (English Translation Provided).

* cited by examiner

DYNAMIC MANAGEMENT OF DATA WITH CONTEXT-BASED PROCESSING

CROSS-REFERENCE TO RELATED APPLICATION

This application is a continuation of U.S. patent application Ser. No. 16/933,482 filed on Jul. 20, 2020, which is a continuation of U.S. patent application Ser. No. 16/237,312 filed on Dec. 31, 2018, which issued as U.S. Pat. No. 10,719,625 on Jul. 21, 2020, which is a continuation of U.S. patent application Ser. No. 15/154,811 filed on May 13, 2016, which issued as U.S. Pat. No. 10,169,608 on Jan. 1, 2019. Each of the aforementioned applications is expressly incorporated herein by reference in its entirety.

BACKGROUND

In current electronic systems, data is increasingly being created, collected, and used for a variety of purposes. For example, individuals create and distribute images on their electronic devices, applications and operating systems access or capture personal information, service providers access, capture, and deliver consumer data to electronic devices, and so on. In many instances, parties and entities handling the data are required to comply with various policies, such as laws, regulations, technical or industry standards, business and contractual obligations, use or data subject-specific privacy or security obligations, and so on. In order to honor these policies, administrators, legal teams, entities developing apps, services, and other parties make data-handling decisions. These parties often make decisions based on relatively little information about the data. Further, the parties spend considerable time trying to interpret a multitude of policies. These difficulties often lead to inconsistent decisions regarding how the data can be used. In addition, in many instances inconsistent or incorrect decisions are made that do not comply with applicable policies or that overly restrict the use of the data.

SUMMARY

In accordance with one aspect of the present disclosure, a computer-implemented method is disclosed. The method includes receiving data that has been acquired, determining contextual information regarding data-handling of the data, tagging the data with the contextual information, receiving from a requestor a request regarding the data-handling of the data, determining a response to the request based at least in part on the contextual information and one or more data-handling requirements that are applicable to the request, and providing the response to the requestor. The response may provide guidance on handling the data while complying with the one or more data-handling requirements that are applicable to the data or the request. The response may indicate whether the data-handling indicated in the request can be performed with the data in view of the one or more data-handling requirements that are applicable to the request, or a task that needs to be performed to enable the data-handling to be performed with the data to comply with the one or more data-handling requirements that are applicable to the request.

The contextual information may include at least one of i) function data indicating an action or a type of action for which the data was acquired; ii) authority data indicating at least one of a jurisdiction or authority that is applicable to the data, a law that is applicable to the data, a regulation that is applicable to the data, a rule that is applicable to the data, a standard that is applicable to the data, or an industry practice or procedure that is applicable to the data; iii) control data indicating at least one of a control on the data that is set for a device, a control on the data that is set by or on behalf of a data subject, a control on the data that is set by an entity, a control regarding a data-handling requirement for the data, a control regarding security or privacy of the data, a control regarding consent for the data, a choice mechanism control regarding a manner of obtaining the consent, or a choice control regarding a right to object to use of the data; iv) class data indicating at least one of a class related to a data authority, a class related to the data subject or a device associated with the data subject, a class regarding whether or not the data is sanitized or aggregated, a class related to protected business information, a class related to national security, a class related to protection of Critical Infrastructure, or a class related to public health or safety; or v) history data indicating at least one of actions that the data has been involved with, who initiated actions that the data has been involved with, how the data was acquired, or how the data has changed over time.

The request may ask for information regarding performance of a particular action or type of action with the data.

The method may further include determining an entity that has or will initiate the particular action or type of action. The response may be determined based at least in part on the entity that has or will initiate the particular action or type of action with the data.

The method may further include determining that a particular action or type of action has been performed with the data and updating the contextual information to reflect performance of the particular action or type of action.

The method may further include determining updated contextual information regarding performance of the particular action or type of action based at least in part on an entity that has or will initiate the particular action or type of action with the data, the contextual information, and the one or more data-handling requirements that are applicable to the request.

The method may further include causing the data to be transformed from one form to another form to comply with the one or more data-handling requirements that are applicable to the request.

In accordance with another aspect of the present disclosure, a computer system is disclosed that includes one or more processors and memory. The memory includes instructions that are executable by the one or more processors to perform at least some of the operations described above.

In accordance with another aspect of the present disclosure, a computer-readable medium is disclosed. The computer-readable medium has computer-executable instructions stored thereon that, when executed, cause one or more processors to perform at least some of the operations described above.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
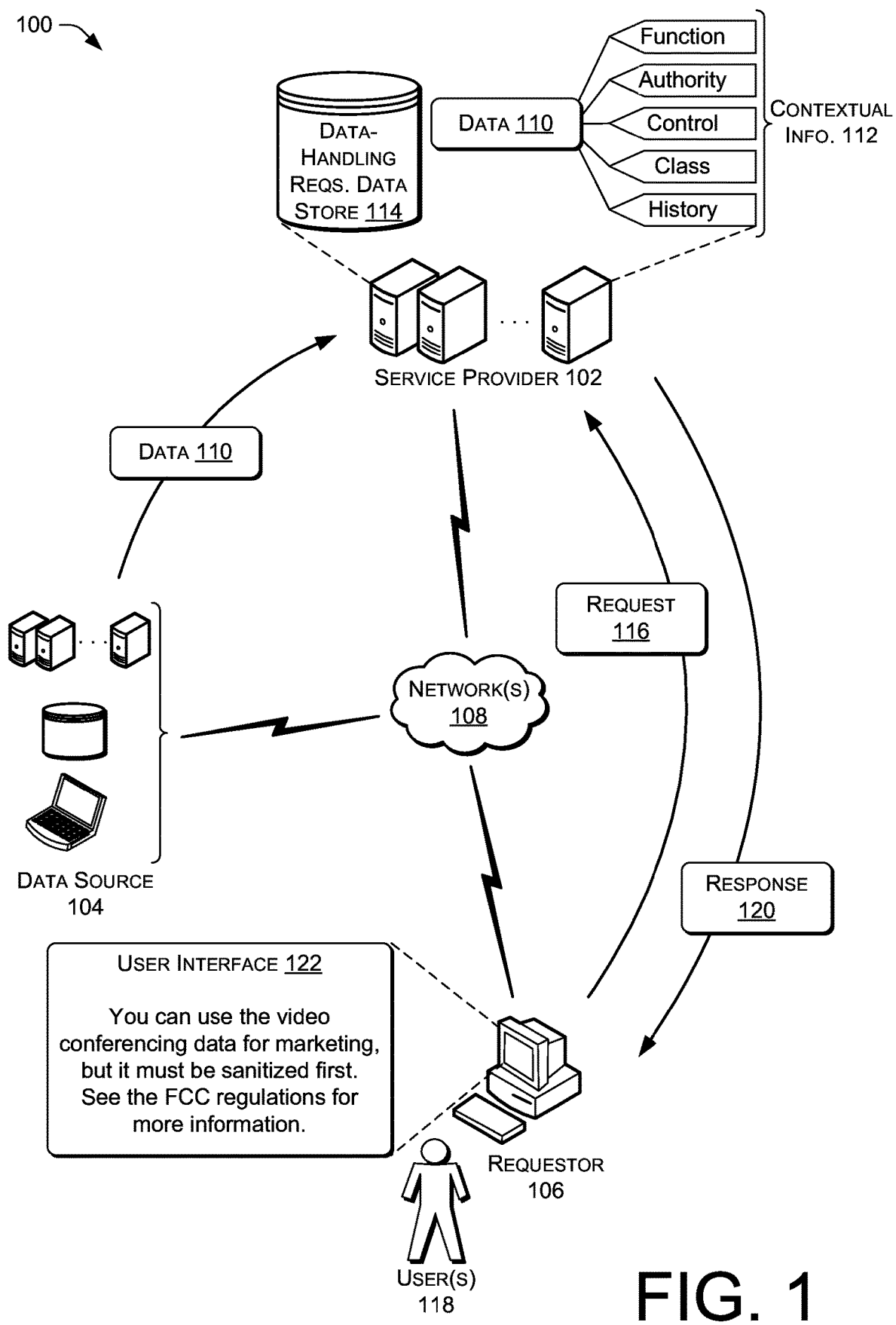
FIG. 1 illustrates an example architecture in which techniques described herein may be implemented.

This disclosure is directed to techniques for determining and/or using contextual information to manage data that is subject to one or more data-handling requirements. In many instances, the techniques capture contextual information surrounding acquisition of the data, associate the contextual information with the data, and update the contextual information as the data is handled throughout its life. The contextual information provides relevant information about the data and/or parties involved to identify data-handling requirements that are applicable, such as jurisdiction, regulations, standards, internal policies, business decisions, privacy obligations, security requirements, and so on. The techniques may analyze the contextual information at any time to provide consistent and/or accurate guidance regarding data-handling of the data. This may ensure that data-handling of the data maintains compliance with applicable data-handling requirements (e.g., policy obligations). Data-handling may include storing, manipulating, sharing (e.g., making publicly available, making available to a party, etc.), publishing, analyzing, archiving, marketing, targeting, selling, transforming, or any other use. In many instances, the techniques provide real-time responses regarding data-handling of the data to requests from entities, such as administrators, applications, and others.

In some examples, the techniques are implemented by a service provider that communicates with data sources associated with entities. A data source may acquire (e.g., obtain, collect, etc.) data as an operation is performed by or for a data subject. A "data subject" may refer to an individual that an entity acquires data from or about. While an "entity" may refer to a company, organization, individual, or another party. In any event, a data source may acquire data and provide the data to the service provider to associate contextual information with the data and/or perform other processing. In one example, an application may acquire (e.g., collect, capture, etc.) video data as two individuals (data subjects) video conference over a network. This video data may be stored (at least temporarily) in a server that is operated by an entity that is associated with the application. In this example, the entity may be a company that operates the video conferencing service. After or during acquisition, the video data may be provided to the service provider to associate contextual information with the video data. The video data and/or contextual information may then be maintained by the service provider and/or the entity associated with the application. In another example, an operating system on a mobile device may acquire a contact list of phone numbers and store the contact list at a server that is operated by an entity that is associated with the operating system. After or during acquisition, the contact list may be provided to the service provider for initial processing (e.g., associate the contact list with contextual information). The contact list and/or contextual information may then be maintained by the service provider and/or the entity associated with the operating system. In these examples, the applicable data-handling requirements (e.g., compliance obligations) for the entities and/or the service provider (and/or any other parties involved with handling the data) may vary depending on various factors, such as who the data is about, who initiated acquisition of the data (e.g., data subject-initiated (actively) or entity-initiated (passively)), a relationship of the data subject to the entity, how the data was acquired (e.g., a technology used), a necessity of interactions and data acquired (e.g., was it necessary to collect the entire contact list) to fulfill the consumer's request (e.g., to perform a service for the customer), and so on.

In any event, the service provider may generate contextual information regarding acquisition and/or data-handling of data. The contextual information may be based on one or more data-handling requirements that are applicable to the data, entities involved with acquiring the data, a technology used to acquire the data, and so on. The contextual information may include various types of information, such as function data, authority data, control data, class data, history data, and so on. In returning to the example above where video data is acquired as two individuals video conference over a network, function data may indicate that the video data is acquired for Internal Operations (IOP) to fulfill the video conferencing service. Further, authority data may indicate that the regulations/laws/rules/etc. set forth by the Federal Communications Commission (FCC) are applicable to the video data. In addition, control data may indicate that the video conferencing data is exempt from control limitations, since the video data is acquired for IOP and a choice mechanism was not provided for acquisition. Additionally, class data may indicate that the video data is Customer Proprietary Network Information (CPNI) within the protected personal information class. Moreover, history data may indicate how the video data was acquired (e.g., a technology used to acquire the video data).

The service provider may then associate the data with the contextual information. In some instances, this includes tagging the data with the contextual information (e.g., creating a new metadata field for the data, updating an existing metadata field for the data, etc.). In other instances, the contextual information and the data are maintained separately and the data merely includes an indication as to where the contextual information is stored. The contextual information and/or the data may be stored by the service provider, an entity associated with the data, and/or another party.

The contextual information may generally be maintained throughout the life of the data. This may include updating the contextual information as the data is handled in various manners. For example, if data is used for targeted advertising and the data is transformed into a sanitized form to do so (e.g., by removing personal information, such as names, telephone numbers, etc.), contextual information for the data may be updated to reflect performance of such actions. This may include updating function data, authority data, control data, class data, and/or history data. To illustrate, the history data may be updated to reflect that the data has been used for targeted advertising and that the data has been transformed into a sanitized form. This may provide a record of how the data has been used, changed, and so on.

In some instances, the service provider may use contextual information to respond to data-handling requests regarding data-handling of the data. A requestor (e.g., internal business area, call from an application or service, machine to machine (M2M), etc.) may send a request to the service provider requesting information on how the data can be used, what needs to occur to use the data for a particular purpose, what data-handling requirements apply to the data, what should be done to address a recent use of the data, or any other question. The service provider may analyze the contextual information and one or more data-handling requirements that are applicable to the request to determine a response. In some instances, the service provider may determine an entity that has or will initiate a particular action or type of action indicated in the request. The service provider may then send the response to the requestor, such as over a network. The response may provide guidance on handling the data while still complying with data-handling requirements that are applicable to the data or the request. If the data is handled in a manner specified in the request, the service provider may update the contextual information to reflect the handling of the data.

The techniques discussed herein may be useful in a variety of contexts and provide a variety of advantages. For example, the techniques may provide real-time guidance on data-handling to ensure compliance with data-handling requirements (e.g., policies) that are applicable to data. Further, the techniques may provide consistent and/or accurate guidance as the data is used, transformed, or otherwise handled through its life. For example, data that was used for one purpose may be used for another purpose that is subject to different data-handling requirements. Moreover, the techniques may consider a multitude of data-handling requirements (e.g., hundreds or thousands of policies from different origins) that are constantly changing. Additionally, or alternatively, the techniques may be used for data collaboratives where entities (e.g., individuals, organizations, businesses, etc.) share data to accomplish a common goal.

Although many instances discuss the techniques in the context of a service provider, the techniques may be implemented in other contexts. In one example, a computing device (e.g., client device, another service provider, etc.) may perform initial processing to generate and/or associate contextual information with data as the data is acquired (e.g., captured). Here, the service provider may receive the data and/or contextual information (or receive access to the data and/or contextual information) to respond to various requests regarding data-handling of the data. As the data is handled in different manners, the computing device and/or service provider may update the contextual information. In yet other examples, a client device may perform the response processing to respond to various requests regarding data-handling.

Example Architecture

FIG. 1 illustrates an example architecture 100 in which techniques described herein may be implemented. The architecture 100 includes a service provider 102 configured to communicate with a data source 104 and/or a requestor 106 to manage data that is subject to one or more data-handling requirements. For instances, the service provider 102 may create contextual information regarding data-handling, update contextual information as data is handled (e.g., used/changed), update contextual information as data-handling requirements change, and/or perform a variety of other operations. Data-handling may include accessing, storing, manipulating, sharing (e.g., making publicly available, making available to a party, etc.), publishing, analyzing, archiving, marketing, targeting, selling, destroying, transforming, or any other use. The service provider 102, the data source 104, and/or the requestor 106 may communicate via one or more networks 108. The one or more networks 108 may include any one or combination of multiple different types of networks, such as cellular networks, wireless networks, Local Area Networks (LANs), Wide Area Networks (WANs), Personal Area Networks (PANs), and the Internet.

In the example of FIG. 1, the data source 104 may acquire data 110. The data source 104 may include any type of computing device that is configured to acquire data, such as a service provider, a data store, or a computing device (as illustrated in FIG. 1). Data acquisition may include obtaining data, collecting data, capturing data, storing data (even if stored temporarily), creating data, and so on. As one example, an application running on a client device may store an image that a data subject took though a camera on the client device. As another example, a service may collect error data regarding a crash of an application on a client device.

The service provider 102 may be implemented as one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, network resources, storage resources, and the like, that operate remotely to the data source 104 and/or the requestor 106. To illustrate, the service provider 102 may implement a cloud computing platform/infrastructure for building, deploying, and/or managing applications and/or services.

The service provider 102 may receive the data 110 from the data source 104 to perform initially processing to determine (or generate) contextual information 112 for the data 110. The data 110 may be sent to the service provider 102 as the data 110 is being acquired, shortly after the data 110 is acquired, well after the data 110 is acquired, or any other time. Such initial processing may be based on one or more data-handling requirements (stored in a data-handling requirements data store 114) that are applicable to the data 110. The contextual information 112 may include function data, authority data, control data, class data, and/or history data (as illustrated in FIG. 1). The contextual information 112 may then be associated with the data 110 through tagging or other methods. The data 110 and/or the contextual information 112 may be stored together or separately at the data source 104, the service provider 102, or elsewhere. In one example, the data 110 and/or the contextual information 112 are sent back to the data source 104 for storage. In another example, the data 110 and/or the contextual information 112 are maintained at the service provider 102. Further details regarding contextual information will be discussed below in reference to FIG. 2.

The service provider 102 may additionally, or alternatively, perform processing (e.g., response processing) to provide guidance regarding data-handling of the data 110. In some instances, data-handling may refer to a time when a decision is being made regarding handling of data. As illustrated in FIG. 1, the requestor 106 may send a request 116 via the one or more networks 108 to the service provider 102 for information about data-handling of the data 110. In some instances, the request 116 is provided by a user 118 (e.g., data subject, other individual, etc.) associated with the requestor 106, while in other instances the request 116 is provided by an application, process, service, User Interface (UI), Application Programming Interface (API), Operating System (OS), component of OS, middleware, data subject, or other entity/component. In one example, the request 116 may be a what-if request regarding a hypothetical use of the data 110 (e.g., "Can the data 110 could be used for marketing?"). In another example, the request 116 may seek information regarding a previous use of the data 110 (e.g., "Were we allowed to use the data 110 for marketing?"). In yet another example, the request 116 may seek information regarding data-handling requirements that apply to the data 110 (e.g., "What policies apply if we were to use the data 110 for marketing?"). In other examples, other types of information may be requested. In any event, the service provider 102 may analyze the data 110, the contextual information 112, and/or one or more data-handling requirements that are applicable to the request 116 to determine (or generate) a response 120. Further details of the response processing will be discussed below in reference to FIG. 2.

The service provider 102 may then send the response 120 to the requestor 106 via the one or more networks 108. The response 120 may provide guidance on how the data 110 can be handled, tasks to be performed to enable handling of the data 110, data-handling requirements that apply to the data 110, and so on. In some instances, such as when a first party or third party entity provides the request 116, a user interface 122 is provided with the response 120. In the example of FIG. 1, the requestor 106 has asked if data collected from a video conferencing service can be used for marketing purposes. Here, the user interface 122 advices the requestor 106 that "You can use the video conferencing data for marketing, but it must be sanitized first. See the FCC regulations for more information." Although in other examples the response 120 may not be provided through a user interface and/or to a requestor. For instance, the response 120 may be used by an application or software component to perform additional processing (e.g., the application or software component may be using data to market a product, and check with the service provider 102 to see if such purpose is allowed).

The data source 104 and/or the requestor 106 may comprise any type of computing device, such as a laptop computer, a desktop computer, a server, a smart phone, an electronic reader device, a mobile handset, a personal digital assistant (PDA), a portable navigation device, a portable gaming device, a video game console, a tablet computer, a watch, a portable media player, a wearable computing device (e.g., a watch, an optical head-mounted display (OHMD), etc.), a pair of head-mounted smart glasses (e.g., mixed reality head-mounted smart glasses), a motion sensing device, a television, a computer monitor or display, a set-top box, a computer system in a vehicle, an appliance, a camera, a robot, a hologram system, a security system, a thermostat, a smoke detector, an intercom, a home media system, a lighting system, a heating, ventilation and air conditioning (HVAC) system, a home automation system, a projector, an automated teller machine (ATM), and so on. In some instances, the computing device may comprise a mobile device, while in other instances the computing device may be a stationary device.

The data source 104 and/or the requestor 106 may each be equipped with one or more processors, memory, one or more interfaces (e.g., a communication interface(s) (network interface(s)), an input/output interface(s), etc.), one or more displays, one or more sensors, etc. The one or more processors may include a central processing unit (CPU), graphics processing unit (GPU), a microprocessor, and so on. The one or more displays may include a Liquid-crystal Display (LCD), a Light-emitting Diode (LED) display, an organic LED display, a plasma display, an electronic paper display or any other type of technology. The one or more sensors may include a proximity sensor that detects a proximity of objects to the device, an infrared (IR)/thermal sensor, a Wi-Fi® sensor, a Bluetooth® sensor, a camera, a microphone, an accelerometer, a compass, a gyroscope, a magnetometer, a Global Positioning System (GPS), a depth sensor, an olfactory sensor (e.g., for smell), or other sensor. The data source 104 and/or the requestor 106 may be associated with an input/output device, such as a keyboard, mouse, trackpad, monitor, speaker, printer, and so on.

Although the data source 104 and the requestor 106 are illustrated as different computing devices in the example architecture 100, in some examples the computing devices are the same. For instance, a same computing device may acquire (e.g., capture) data and request information from the service provider 102 regarding handling of the data.

Example Device

Figure 2:
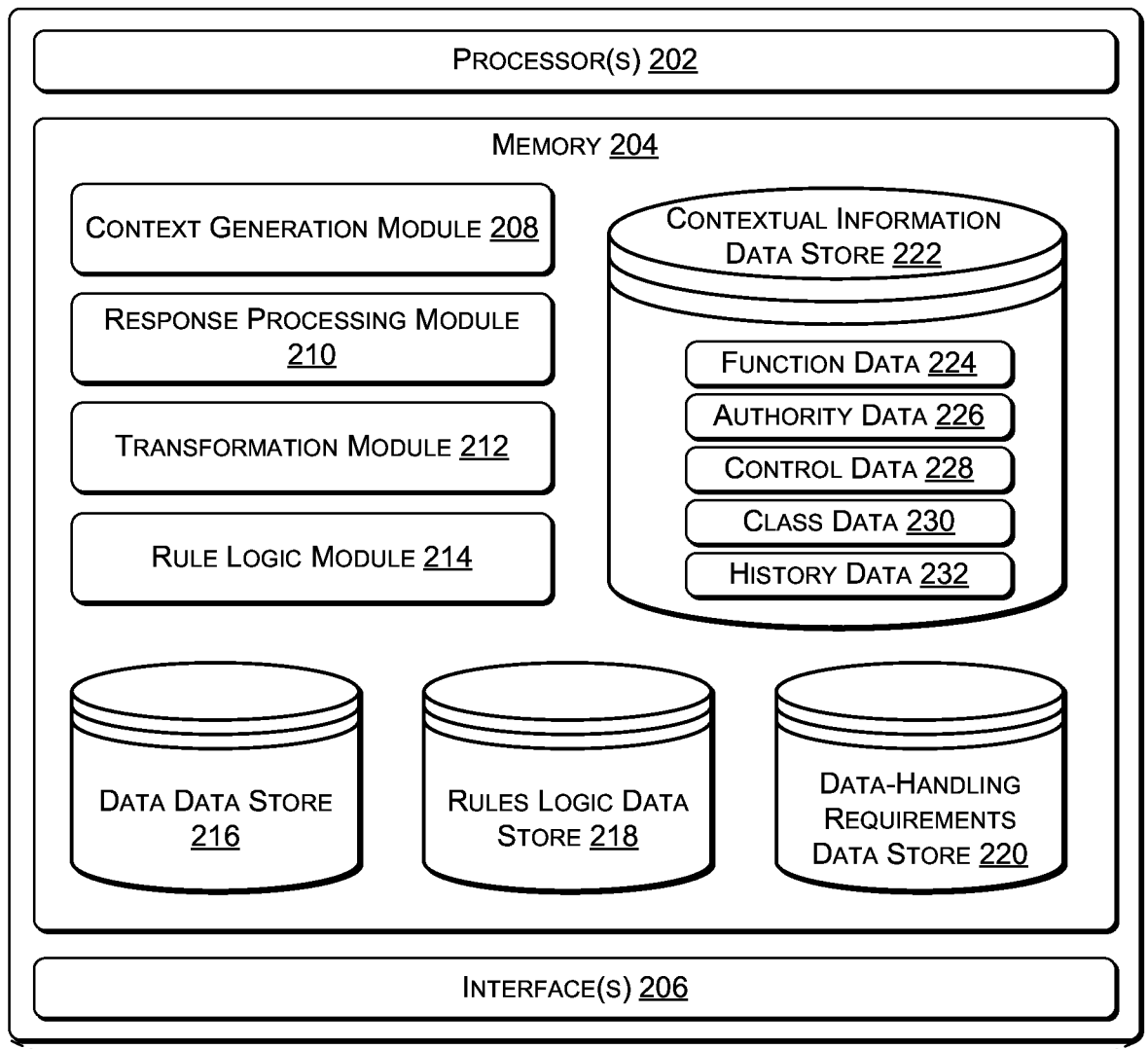
FIG. 2 illustrates details of the example service provider of FIG. 1.

FIG. 2 illustrates details of the example service provider 102 of FIG. 1. For ease of illustration, many techniques will be discussed in the context of the example architecture 100 of FIG. 1. However, such techniques may be implemented in other architectures. As noted above, the service provider 102 may be implemented by one or more computing devices. The one or more computing devices may be equipped with one or more processors 202, memory 204, and/or one or more interfaces 206 (e.g., a communication interface(s) (network interface(s)), an input/output interface(s), etc.). The one or more processors 202 may include a central processing unit (CPU), graphics processing unit (GPU), a microprocessor, and so on. The one or more interfaces 206 may receive and/or send information (e.g., data from a data source, contextual information, a request, a response, etc.) over a network. The one or more processors 202, the memory 204, and/or the one or more interfaces 206 may be communicatively coupled to each other.

The memory 204 (as well as all other memory described herein) may include one or a combination of computer-readable media. Computer-readable media may include computer storage media and/or communication media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media (also referred to as "computer-readable storage media") does not include communication media.

The memory 204 may include one or more modules to implement particular operations. A module may represent software functionality. Further, the term "module" represents example divisions of software for purposes of discussion, and is not intended to represent any type of requirement or required method, manner or organization. Accordingly, while various "modules" are discussed herein, their functionality and/or similar functionality could be arranged differently (e.g., combined into a fewer number of modules, broken into a larger number of modules, etc.). While certain functions and modules are described herein as being implemented by modules executable by one or more processors, any or all of the modules may be implemented in whole or in part by one or more hardware logic components to execute the described functions. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. As illustrated, the memory includes a context generation module 208, a response processing module 210, a transformation module 212, and a policy/rule module 214.

The context generation module 208 may receive data to be associated with contextual information. For example, data may be received from the data source 104, retrieved from a data store 216, and so on. As used herein, "data" may refer to any type of data including personal data (e.g., images or video taken by a data subject, telephone numbers, social security numbers, mailing addresses, email addresses, profile information, account information (e.g., data subject's name, password, etc.), posts to a social networking site, purchase history, contact lists, demographic information, etc.), business data (e.g., sales records, employee lists, etc.), content items (e.g., images, videos, audio, articles, electronic books, etc.), application data regarding execution of an application, location data (e.g., geolocation data for a mobile device), usage data (e.g., number of calls made, number of messages sent, data used, etc.), network traffic data (e.g., network routing information, etc.), metadata, error data (e.g., performance and reliability data, network connection quality, error logs, etc.), and so on.

In some instances, data may be linked or linkable to a data subject. For example, the data may include information that identifies a data subject (e.g., a name of the data subject), data that is acquired due to actions taken by a data subject (e.g., an email address acquired when an individual sends an email, network traffic data acquired to send an email, etc.), or data that is otherwise associated with a data subject (e.g., associated with a device that is linked to a data subject). Additionally, or alternatively, data may be associated with an entity. For example, a manufacturer of a mobile device may embed software on a mobile device to log error data, camera data, location data, etc. As another example, a telecommunications carrier (e.g., AT&T®, Verizon®, etc.) may acquire voice data, text data, network traffic data, etc. As yet another example, a developer of an application may collect data related to use of the application. As a further example, a company that operates an online site may acquire data about an individual, such as items the individual has purchased or viewed, account information, etc.

The context generation module 208 may determine (or generate) contextual information regarding data and interactions. Contextual information may be used by the response processing module 210 (or other components) to provide commands and/or guidance on how data can be handled while complying with a data-handling requirement that is applicable to the data. To determine (or generate) contextual information, the context generation module 208 may determine an entity that acquired the data, such as a company, organization, individual, or other party that is involved in collecting the data. Further, the context generation module 208 may determine how the data was acquired, such as data subject-initiated (actively) or entity-initiated (passively). Data subject-initiated (actively) may include a data subject providing some input to perform an action, such as sending an email, downloading an item, editing a photo, etc. While entity-initiated actions may be performed without knowledge or input by a data subject (e.g., passively), such as a company monitoring network traffic to/from an Internet Service Provider (ISP), a company monitoring location data of a mobile device, an API collecting data, etc. Moreover, the context generation module 208 may determine a technology that was used to acquire data, such as browser-based cookie tracking, mobile or non-browser-based tracking technology, Voice Over IP (VOIP), embedded software interaction (e.g., carrier-controlled on a mobile device), online, a preloaded or data subject-installed application, location-based services (e.g., precise or non-precise), and so on. Additionally, the context generation module 208 may determine a choice mechanism requirement for the data subject to express or modify a previous consent choice. A choice mechanism may also indicate a manner which consent was obtained from a data subject to collect data from the data subject. For example, a choice mechanism may indicate that a pop-up window was presented with a check-box to select whether or not an application is allowed to collect location data from the data subject while using the application. Furthermore, the context generation module 208 may determine a choice control indicating a right-to-object or opt-out of collecting data. A right-to-object or opt-out of collecting data may refer to a data subject's expression of not receiving content. For example, a data subject may have a certain time period to opt-out or express an objection to using data associated with a data subject to provide advertisements.

The context generation module 208 may use the information determined above (e.g., an entity that acquired the data, how the data was acquired, a technology used, a choice mechanism, and/or a choice control) and/or rule logic stored in a rule logic data store 218 to determine (or generate) contextual information for data. The rule logic may define what data-handling requirements (from a data-handling requirements data store 220) apply to the data, as discussed further below. In some instances, the context generation module 208 may operate in cooperation with the rule logic module 214, which may access and/or evaluate rule logic. The data-handling requirements data store 220 may be the same as the data-handling requirements data store 114 of FIG. 1. The context generation module 208 may associate contextual information with data and/or store the contextual information and/or data together or separately. For example, contextual information may be stored in a contextual information data store 222. The context generation module 208 may additionally, or alternatively, update contextual information as events occur. For example, when data is used for a purpose (e.g., an action is performed on the data), the associated contextual information may be updated. In another example, when data is transformed from one form to another (e.g., sanitized), the associated contextual information may be updated to reflect the new form. As illustrated, contextual information may include, for example:

Function data 224 indicating an action or a type of action for which data was acquired. Example actions or types of actions include Commercial Data Practices (CDP)—actions performed by a business to generate additional revenue using the company's customer base and data subjects' information to target advertising and commercialize third party products or services (e.g., tracking to amass a behavioral or ad profile, profiling, targeting, retargeting, etc.); Internal Operations (IOP)—actions performed internally within an organization to run the organization (e.g., product/service fulfillment, network operations, safety actions, security actions, actions to prevent fraud, first party marketing, etc.); public work actions taken for the public good—Critical Infrastructure Information/Public Good actions (e.g., Critical Infrastructure Information (CII) actions, Protected Critical Infrastructure Information (PCII) actions (including identify, protect, detect, respond, recover, etc.), etc.), presidential directives, information sharing actions for a public organization, particular research actions, actions under the CII Act, and so on.

Authority data 226 indicating a jurisdiction and/or authority that is applicable to data, a law that is applicable to the data, a regulation that is applicable to the data, a rule that is applicable to the data, a standard that is applicable to the data, and/or an industry practice or procedure that is applicable to the data. A jurisdiction, authority, law, regulation, rule, standard, or industry practice or procedure that is applicable to the data may include a jurisdiction, authority, law, regulation, rule, standard, or industry practice or procedure that is applicable to handling of the data. Example jurisdictions and/or authorities include a country (e.g., the United States, Canada, France, etc.), a federal government, a state or state government, a region, a regulatory agency (e.g., FTC, FCC), etc. The jurisdiction may govern the handling of data. Example laws, regulations, and regulatory agency rules include laws/regulations/rules associated with the Global Data Protection Regulation (GDPR), laws/regulations/rules associated with the Federal Trade Commission (FTC) (e.g., the FTC framework), laws/regulations/rules associated with the Federal Communications Commission (FCC) (e.g., Customer Proprietary Network Information (CPNI) framework), laws/regulations/rules associated with the Department of Homeland Security (DHS) (e.g., National Security and Critical Infrastructure Information (CII) framework, PCIIMS framework, etc.), the Children's Online Privacy Protection Act (COPPA), the Fair Credit Reporting Act (FCRA), the Health Insurance Portability and Accountability Act (HIPAA), international laws/regulations/rules, laws/regulations/rules associated with any country, and so on. Example standards include technical standards (e.g., standards defined by the National Institute of Standards and Technology (NIST), standards defined by the International Organization of Standardization (ISO), etc.), industry standards (e.g., Payment Card Industry Data Security Standard (PCI DSS), Data Authentication Algorithm (DAA), Network Advertising Initiative (NAI) standards, Generally Accepted Accounting Principles (GAAP), and so on. Example industry practices or procedures include privacy practices/procedures to protect private data, security practices/procedures, antitrust practices/procedures, and so on. As such, the authority data 226 may set forth a framework identifying the jurisdictions, laws, regulations, rules, standards, practices, and/or procedures that are applicable to data.

Control data 228 indicating a control on handling of data. Example controls include a control on data that is set for a device (e.g., a control set by a data subject, parent, or the primary account holder indicating to not use data from a particular device or for specific purposes (tracking, advertising, etc.); a control (limit) on spending, time, usage, media viewing rating, etc. for a particular device; and so on), a control on data that is set for a data subject (e.g., a control set by a data subject, parent, or primary account holder indicating to not expose data to a particular party(ies) or use data for a particular action or purpose; a control (limit) on spending, time, usage, media viewing rating, etc. for a particular party; and so on), a control on data that is set by an entity (e.g., contractual terms and conditions, etc.), a control regarding a data-handling requirement for data (e.g., a PCII delegate control Membership in a Public Collaborative Information Sharing Organization, etc.), a control regarding security or privacy of the data (e.g., a control for a security level associated with data, such as national security; a control for privacy that is specific to an entity; a control related to confidentiality; etc.), a control regarding consent for data (e.g., indicating whether or not consent was obtained to collect or use data; a type of consent—explicit consent from a data subject, implicit consent from a data subject to collect or use data, etc.), a choice mechanism control regarding a manner of obtaining consent (e.g., what information was provided to a data subject to obtain consent, a manner of obtaining consent from a data subject, etc.), a choice control regarding a right-to-object or opt-in/out of using data (e.g., including a double opt-in (subscribing and confirming the subscription)), etc. In some instances, a control regarding security may be relevant to national security, while a control regarding privacy may be relevant to personal information.

Class data 230 indicating data covered in a protected personal information class (e.g., related to a data subject or device associated with the data subject), protected business information class, protected public or national security information class (critical infrastructure and for the public good), de-identified or aggregate data (not linkable to any individual data subject), data in the public domain (e.g., data made publicly available by an entity, data subject, or others), etc. Examples of protected personal information classes include, Protected Health Information (PHI), Non-Public Personal Financial Information (NPPI-F), linkable private or personal information (PPI-L) covered by the Privacy Act and the FTC Act, personal information from or about a child (PPI-C), protected telecommunications information (Customer Proprietary Network Information (CPNI) etc.), information subject to a protection authority (e.g., the authority for which data is subject can be based on one or more of the following: residency or where an action transpired (European Unity (EU) jurisdiction, State of California, etc.), type of data subject (data linkable to a child), topic or subject matter (data related to one's health condition, non-public financial information, information sought by identity thieves or specifically covered by law such as Video Viewing Information protected by the Video Viewing Protection Act), type of technology used to acquire data (e.g., non-aggregate data captured/transmitted over interconnected Voice Over IP (VOIP) is CPNI governed by FCC, while communications through other technologies are not CPNI and are governed by the FTC, and mobile device versus PC), and/or by linkability of data (e.g., personal data attributes have been permanently removed from data with no plans or known means to re-identify (e.g., permanently de-identified, anonymous and aggregate data etc.))), and so on. In most instances, protected personal information classes cover linkable personal information data associated with a data subject, that may include linkability through a unique identifier associated to the data subject, such as a social security number, information for the data subject's device (e.g., device ID, MAC address, or the data subject's account), etc. Further, in many instances a distinguishing identifier for Information classes for the Public Good and Critical Infrastructure Information may be based on the relationship of the information to national security or public good. Example information that may be classified for the Public Good or Critical Infrastructure Information may include data labeled in the PCII information class (e.g., data handled according to the standards and requirements adopted in DHS's protected critical infrastructure information procedures). Similar provisions (e.g., standards, requirements, etc.) may apply world-wide for sharing information and processing collaboration efforts for public health and safety purposes. Example protected business information classes include proprietary, competitively sensitive information, confidential, attorney-client privilege, intellectual property, non-public internal use only, etc.

History data 232 indicating the origin and subsequent actions that the data has been involved with (e.g., data-handling actions), who initiated the actions that the data has been involved with (e.g., entities involved in data-handling actions), how the data was acquired, how the data has changed over time (e.g., how the data has been transformed), etc. Example history data indicates an origin of data (how the data was acquired) (e.g., whether the data was acquired passively (entity-initiated) or actively (data subject-initiated), a source of acquisition—an entity involved with acquisition of data, a technology that was used to acquire data, a timestamp indicating when data was acquired, a log of actions/rules that applied when the data was acquired and for each subsequent action that involves the data, etc.), a role of a data source that acquired or is taking subsequent action involving data or a role of the service provider 102 (e.g., $1^{st}$ party, operator, service provider, carrier, $3^{rd}$ party, data aggregator, records management (retention, hold, expiry, etc.)), special handling of data (e.g., triggers, transformations, C&Os, etc.), configuration information of a device associated with the action (that acquired the data, accessed or transmitted data) involving the data (e.g., Operating System (OS) version, Original Equipment Manufacturer (OEM), product/service version, etc.), transformation of the data (e.g., what type of transform occurred—from telemetry to profile data, etc.), and so on. Any of the pieces of the history data 232 may be associated with a timestamp indicating when an event/action occurred. In some instances, the history data 232 may allow changes that occur to data and/or handling of the data to be tracked to ensure compliance with data-handling requirements throughout the life of the data (e.g., enable auditing of data and/or uses of data from acquisition and for each touchpoint).

Etc.

As one illustration, assume that a data subject (e.g., consumer associated with a device) downloads a photo editing application and uses the application to edit a photo on the device. Here, the application captures a copy of the photo, an edited copy of the photo, and data regarding the event (e.g., metadata including geolocation indicating where the photo was taken, a time edits were made, the type of edits made, etc.). In this illustration, the contextual information may include function data indicating that the data (e.g., copy of photo, edited copy of photo, and data regarding the event) were captured for Internal Operations (IOP), such as product/service fulfillment, safety and security fraud, marketing, etc. Further, the contextual information may include authority data indicating that the laws/rules/regulations set forth by the Federal Trade Commission (FTC) are applicable to the data. Moreover, the contextual information may include control data indicating that the data is exempt from controls since the application is not required to inform the data subject about the data being captured (e.g., assume the data acquired for IOP is essential to the consumer's request or action initiated by the consumer). In addition, the contextual information may include class data indicating that the data is protected personal information that is linked to the data subject. Furthermore, the contextual information may include history data indicating information about how the data was captured (e.g., a time the data was captured, the data subject initiated capture of the data (by editing the photo), etc.), any actions that actions that the data has been involved with (none at this point), who initiated the actions that the data has been involved with, and so on.

The response processing module 210 may provide guidance regarding data-handling or a command. In some instances, encountering a trigger event or condition that requires a transformation may cause a command to be sent to the transform module 212 to initiate processing for that event or condition (e.g., initiate a transformation of data) before rule logic is identified in by the rule logic module 214. The response processing module 210 may generally receive a request from a requestor, determine a response to the request, and/or send the response to the requestor. In some instances, a request may specify a particular action or type of action that will be performed with the data or that has been performed with the data. The action or type of action may include accessing, storing, manipulating, sharing (e.g., making publicly available, making available to a party, etc.), publishing, analyzing, archiving, marketing, targeting, selling, destroying, transforming, or any other use. As one example, a requestor may ask if it is alright to use data for marketing a new product to data subjects. As another example, a request may ask for data-handling requirements that apply to data. To illustrate, a company seeking to acquire cellular network data may request rules that apply to handling cellphone data to figure out latency rates on average for consumers' data service interactions with the company's first party mobile app. As a further example, a request may ask for a history of what has occurred to data for a specific point in time or since originally acquired. Further, in some instances a request may specify an entity involved in taking an action or type of action with data (e.g., an entity that will perform or has performed the action with the data). As such, a request may specify various information, such as data involved, an action or type of action involved with data, entities involved in an action or type of action, and so on.

To determine a response, the response processing module 210 may retrieve contextual information associated with data identified in a request. The response processing module 210 may also analyze information included in a request (e.g., an action or type of action being requested, an entity involved, etc.) and/or rule logic stored in the rules logic data store 218. In some instances, the response processing module 210 may operate in cooperation with the rule logic module 214, which may access and/or evaluate rule logic.

The rule logic may identify data-handling requirements that are applicable to the request. The response processing module 210 may then determine new contextual information that is relevant to the request based on the current contextual information that is associated with the data, data-handling requirements that are applicable to the request, an action or type of action being taken, an entity involved in performing the action or type of action, and so on. The response processing module 210 may then determine a response to the request based on the current contextual information, the new contextual information that is relevant to the request, data-handling requirements that are applicable to the request, an action or type of action being taken, an entity involved in performing the action or type of action, and so on. The response processing module 210 may provide the response to the requestor (e.g., in an electronic format). In some instances, if an action or type of action identified in a request is performed, the contextual generation module 208 may update contextual information to reflect performance of the action or type of action. For example, data may be associated with new contextual information that was determined for the request. This may include updating history data (or any other pieces of the contextual information) to reflect performance of the action or type of action and/or new data-handling requirements that are now applicable to the data (which may, in some instances, be processed in the transformation module 212).

A response may provide various guidance to a request. Example information in a response may include an action or type of action that can be performed in view of a data-handling requirement, a task that needs to be performed so that a requested action or type of action can be performed (e.g., sanitize the data or otherwise transform the data), whether or not a particular action or type of action can be performed (e.g., whether or not data subject purchasing history can be used to market a product in the particular situation described in a request), a data-handling requirement that applies to a situation (e.g., FCC regulations apply), a history of data (e.g., how it has been used, transformed, etc.), and so on. In some instances, a response regarding history of data may provide details mentioned in history data for the associated contextual information (e.g., the history data 232).

In one illustration, assume a company sends a request regarding whether or not geolocation data can be used to send advertisements to data subjects. Here, the response processing module 210 (which may operate in cooperation with the rule logic module 214) may identify contextual information for the geolocation data and identify (based on the contextual information) rule logic that is applicable to using the geolocation data to send advertisements. The rule logic may identify data-handling requirements that are applicable to the request. The response processing module 210 may also identify an entity involved in sending the advertisements, namely the company. Further, the response processing module 210 may determine new contextual information that is applicable to the request. The response processing module 210 may then formulate a response based on the contextual information, the new contextual information, the data-handling requirements that are applicable to the request, an action or type of action being taken (e.g., sending advertisements), and/or an entity involved in performing the action or type of action (e.g., the company). The response may be provided to the company. Here, the response may indicate whether or not the geolocation data may be used to send advertisements.

In some instances, the response processing module 210 may provide guidance regarding data-handling in other situations besides a request and response context. For example, if a requestor operating a client device selects data to be exported from an environment (e.g., selects content stored in a company server to be attached in an email), the response processing module 210 may detect such action and trigger an analysis of such action. In particular, the response processing module 210 may determine whether the data can be exported based on contextual information associated with the data and/or data-handling requirements that are applicable to such export. Then, the response processing module 210 may send information regarding the handling of the data. Here, a pop-up window may be displayed on the requestor's client device to indicate whether or not the data can be exported and/or what tasks should be performed so that such export may occur.

The transformation module 212 may transform data from one form to another form. Such transformation may include sanitizing (anonymizing) data to remove personal identifying information from the data either permanently or temporarily, converting telemetry data to profile data, or otherwise converting data from one type to another type. Personal information may include any information that is linkable to a particular data subject or device, such as a name, email address, login information, unique id, etc. When data is transformed, the associated contextual information may be updated to reflect the transform. In some instances, a transform is performed to facilitate a request for using data. To illustrate, if a request is received regarding use of data for marketing, and it is determined that the data needs to be sanitized prior to such use, the transformation module 212 may sanitize the data when providing a response and/or at a later time in response to input from a data subject to sanitize the data.

The rule logic module 214 may manage and/or evaluate rule logic stored in the rules logic data store 218 and/or data-handling requirements stored in the data-handling requirements data store 220. For example, the rule logic module 214 may evaluate rule logic for other modules. Data-handling requirements (sometimes referred to as compliance rules or decisioning logic) generally represent the obligations and/or exemptions on data derived from applicable policy in context of the action(s) taken. Data-handling requirements may be derived by the rule logic module 214 from regulations, standards (e.g., technical standards, business standards, etc.), laws, rules (e.g., enacted by an agency or organization, etc.), internal policies, contractual obligations, business decisions (e.g., contractual obligations between companies), privacy obligations, security requirements, procedures or practices (e.g., generally accepted industry practices), and so on. Rule logic may define logic regarding data-handling requirements. For example, rule logic may define which data-handling requirement to apply, which data-handling requirement to apply first, which data-handling requirement takes precedence (e.g., when there are competing data-handling requirements), how to apply a data-handling requirement, and so on. In some instances, rule logic may be specified by an individual or group of individuals, such as individuals selected from a legal department, a security and privacy department, a marketing department, and so on. In other instances, rule logic is generated automatically. As such, data-handling requirements may be converted into rule and/or decisioning logic.

In some instances, the rule logic module 214 may monitor rule logic and/or data-handling requirements to detect changes to the rule logic and/or data-handling requirements (e.g., from policy or rule makers). If a change is detected, the rule logic module 214 may send a notification to an entity, such as an entity that is relying on guidance from the service provider 102, an entity that previously received a response from the service provider 102, etc. The notification may indicate that a change has occurred to rule logic and/or a data-handling requirement. The notification may additionally, or alternatively, indicate whether or not a current handling of data is in compliance with the change to the rule logic and/or data-handling requirement.

Additionally, or alternatively, in some instances the rule logic module 214 (as well as the response processing module 210 and/or the transformation module 212) may identify anomalies that occur due to incorrect rule logic and/or data-handling requirements (e.g., mutually exclusive rule logic). For example, assume a response to a first request incorrectly indicates that personal data can be used for marketing purposes and a response to a second request correctly indicates that personal data needs to be anonymized before it is used for marketing purposes. If both responses were determined based on the same rule logic (which somehow came up with different answers), the rule logic module 214 may determine an anomaly and alert an administrator or other individual to check the rule logic. In some instances, the rule logic module 214 may automatically resolve conflicts using conflict resolution rules.

In some instances, the service provider 102 may maintain integrity and/or confidentiality of data and/or metadata. For example, the rule logic module 214 may check if rules are tampered with (e.g., via signature checks) and/or may provide decryption keys to a request for data that is encrypted if specific conditions are met.

Although the modules 208-214 and the data stores 216-222 are illustrated as being included within the service provider 102 any of the modules 208-214 and the data stores 216-222 may be included elsewhere. For example, any of the modules 208-214 and/or the data stores 216-222 may be included in the data source 104 and/or the requestor 106 of FIG. 1. As such, in some instances the service provider 102 may be eliminated.

In some instances, the service provider 102 may employ any of the modules 208-214 and/or the data stores 216-222 to implement data compliance platforms. A data compliance platform may be associated with a predefined set of rule logic and data-handling requirements to provide commands or guidance regarding a particular context. For example, a data compliance platform may be tailored to Critical Infrastructure Information (CII) by including rule logic and/or data-handling requirements that are applicable to CII, while another data compliance platform may be tailored to Qualified Internal Operations (IOP) (or Commercial Data Practices (CDP) and non-qualified-IOP). In some instances, data may be converted to be implemented in different data compliance platforms. Further, in some instances a data compliance platform may inform or act as a gatekeeper to grant or deny access to data (e.g., based on credentials that are provided by a requestor). Although the gatekeeper is discussed in the context of a data compliance platform, the service provider 102 may operate as a gatekeeper in any other context. Data compliance platforms may provide a variety of advantages. For example, data compliance platforms may physically isolate different contexts from each other and/or virtually enable a specific service to be provided for a particular context. To illustrate, a first data compliance platform for a first industry may be offered (e.g., as a paid subscription) to customers of the first industry, while a second data compliance platform for a second industry may be offered to customers of the second industry. Additionally, a third compliance platform may be offered for a particular collaborative context in which a first industry and a second industry share data and/or processing.

Example Processes

Figure 3:
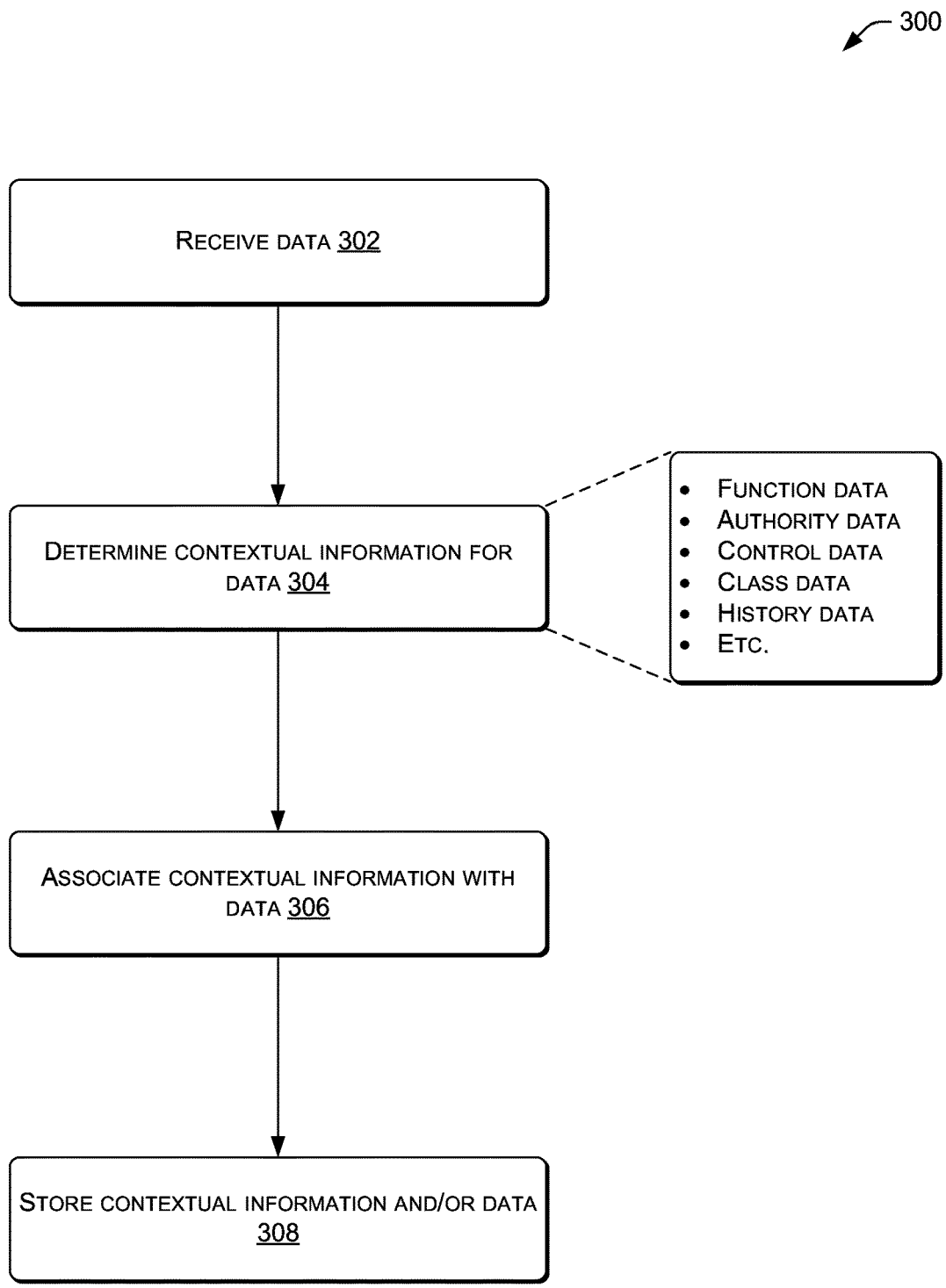
FIG. 3 illustrates an example process to determine contextual information regarding data-handling of data and to associate the contextual information with the data.
Figure 4:
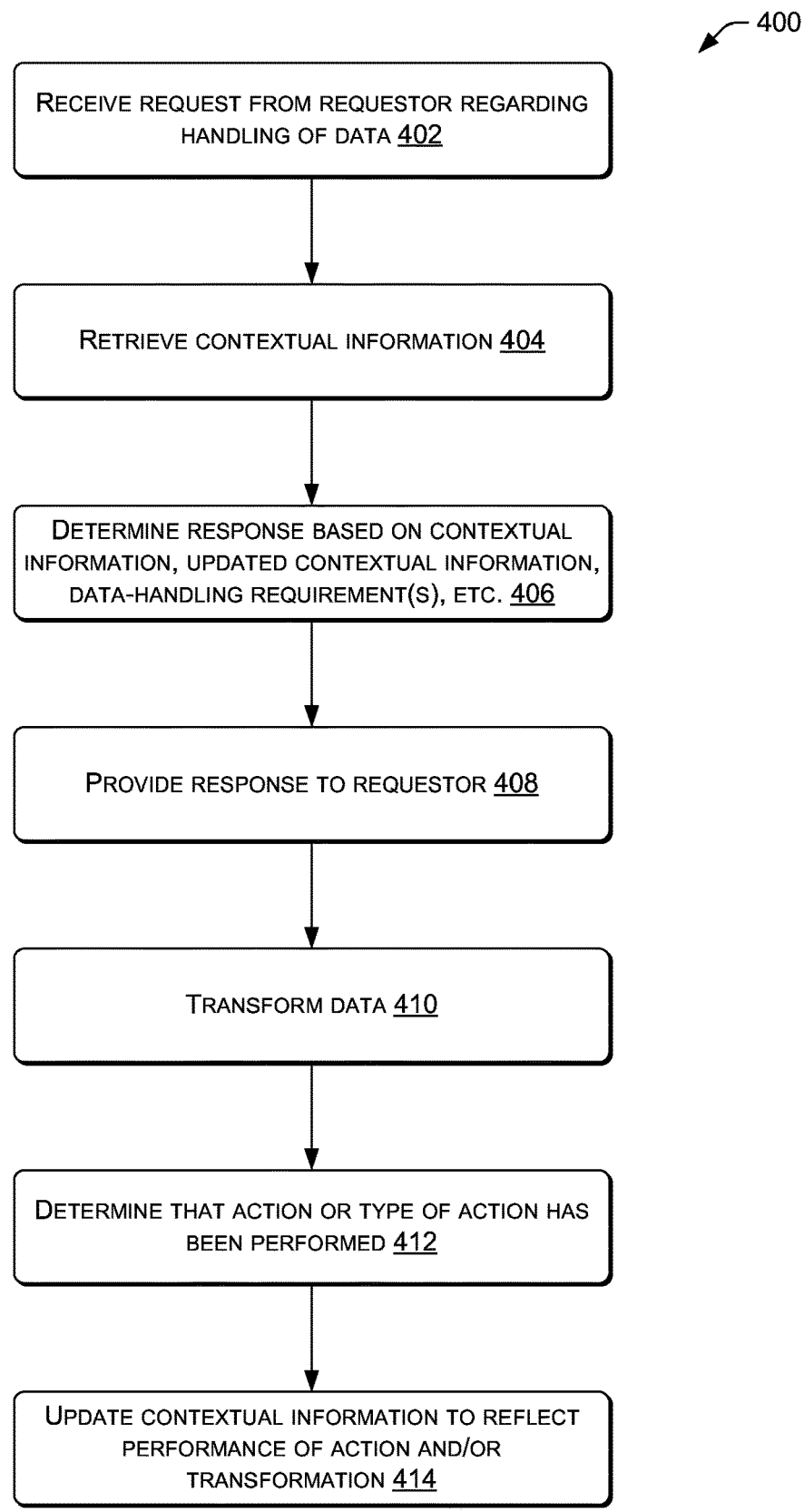
FIG. 4 illustrates an example process to respond to a request for information regarding data-handling of data.

FIGS. 3 and 4 illustrate example processes 300 and 400 for employing the techniques described herein. For ease of illustration the processes 300 and 400 are described as being performed in the architecture 100 of FIG. 1. For example, one or more of the individual operations of the processes 300 and 400 may be performed by the service provider 102, the data source 104, and/or the requestor 106. However, the processes 300 and 400 may be performed in other architectures. Moreover, the architecture 100 may be used to perform other processes.

The processes 300 and 400 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, configure the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the individual operations may be omitted.

FIG. 3 illustrates the example process 300 to determine contextual information regarding handling of data and associate the contextual information with the data.

At 302, a computing device may receive data. This may include retrieving data from a data store, receiving data from a data source, receiving data from another device or component, and so on.

At 304, the computing device may determine contextual information for the data. The contextual information may include function data indicating an action or a type of action for which the data was acquired, authority data indicating a jurisdiction, authority, law, regulation, rule, standard, industry practice, or industry procedure that is applicable to the data, control data indicating a control on the data, class data indicating a class into which the data is covered, and/or history data indicating actions that the data has been involved with, who initiated the actions that the data has been involved with, how the data was acquired, or how the data has changed over time. In some instances, operation 304 may include identifying a data subject of the data, an entity involved in acquiring the data, a technology that was used to acquire the data, data-handling requirements that are applicable to the data, and so on.

At 306, the computing device may associate the contextual information with the data. This may include tagging the data with the contextual information, associating a pointer or other information with the data pointing to the contextual information, and so on. In some instances, operation 306 may include adding a timestamp indicating a time that the contextual information was associated with the data (e.g., a time that the contextual information was determined).

At 308, the computing device may store the contextual information and/or the data. The contextual information and/or the data may be stored separately or together at the computing device or another device.

FIG. 4 illustrates the example process 400 to respond to a request for information regarding handling of data.

At 402, a computing device may receive a request from a requestor regarding handling of data. In some instances, the request may specify a particular action or type of action that will be performed with the data or has been performed with the data. An action or type of action may include accessing, storing, manipulating, sharing, publishing, analyzing, archiving, marketing, targeting, selling, destroying, transforming, and so on. Further, in some instances the request may specify an entity involved in performing the action or type of action, a data subject, etc.

At 404, the computing device may retrieve contextual information. This may include identifying metadata tags associated with the data for the contextual information, retrieving the contextual information from a data store, and so on.

At 406, the computing device may determine a response to the request based on the contextual information, updated contextual information, and/or one or more data-handling requirements that are applicable to the request. The determination may additionally, or alternatively, be based on an action or type of action being taken, an entity involved in performing the action or type of action, and so on. In some instances, the updated contextual information may comprise the contextual information that is updated to reflect performance of an action or type of action in the request. The response may indicate, for example, whether or not a particular action or type of action can be performed in view of one or more data-handling requirements that are applicable to the request, a task that needs to be performed to enable a particular action or type of action to be performed with the data (e.g., transforming the data, obtaining consent/authorization for performing an action that involves the data, etc.), any action or type of action that can be performed with the data in view of one or more data-handling requirements that are applicable to the data, one or more data-handling requirements that are applicable to the data, a history of the data (e.g., based on history data included within the contextual information), and so on.

At 408, the computing device may provide the response to the requestor. This may include sending the response over a network, causing the response to be output via a User Interface (UI), and so on.

At 410, the computing device may transform the data. This may include transforming the data from one form to another form to comply with one or more data-handling requirements that are applicable to a request. As one example, the data may be transformed by sanitizing the data. In some instances, operation 410 is performed in response to receiving an instruction (e.g., requestor input, instruction from an application, etc.) to perform a transform, so that the data can be used for a particular purpose, such as an action identified in a request. In other instances, operation 410 is performed automatically as part of providing the response. In yet other instances, the data may not be transformed and operation 410 may be omitted.

At 412, the computing device may determine that an action or type of action has been performed. As one example, the computing device may determine that an action or type of action identified in a request has been performed.

At 414, the computing device may update the contextual information to reflect performance of an action and/or transformation of the data. For example, in response to determining that a particular action or type of action has been performed with the data, the computing device may update the contextual information to reflect the performance of the particular action or type of action. As another example, in response to transforming data, the computing device may update the contextual information to reflect the transformation.

Example Clauses

Example A, a method comprising: receiving data that has been acquired; determining, by a computing device, contextual information regarding data-handling of the data, the contextual information including at least two of: function data indicating an action or a type of action for which the data was acquired; authority data indicating at least one of a jurisdiction or authority that is applicable to the data, a law that is applicable to the data, a regulation that is applicable to the data, a rule that is applicable to the data, a standard that is applicable to the data, or an industry practice or procedure that is applicable to the data; control data indicating at least one of a control on the data that is set for a device, a control on the data that is set by or on behalf of a data subject, a control on the data that is set by an entity, a control regarding a data-handling requirement for the data, a control regarding security or privacy of the data, a control regarding consent for the data, a choice mechanism control regarding a manner of obtaining the consent, or a choice control regarding a right to object to use of the data; class data indicating at least one of a class related to a data authority, a class related to the data subject or a device associated with the data subject, a class regarding whether or not the data is sanitized or aggregated, a class related to protected business information, or a class related to national security, a class related to protection of Critical Infrastructure, or a class related to public health or safety; or history data indicating at least one of actions that the data has been involved with, who initiated the actions that the data has been involved with, how the data was acquired, or how the data has changed over time; tagging the data with the contextual information; receiving, by the computing device and from a requestor, a request regarding data-handling of the data; determining, by the computing device, a response to the request based at least in part on the contextual information and one or more data-handling requirements that are applicable to the request; providing, by the computing device, the response to the requestor; determining, by the computing device, that a particular action or type of action has been performed with the data; and updating, by the computing device, the contextual information to reflect performance of the particular action or type of action.

Example B, the method of Example A, wherein the request requests information regarding performance of the particular action or type of action with the data.

Example C, the method of any of Examples A or B, further comprising: determining an entity that has or will initiate the particular action or type of action; wherein the determining the response includes determining the response based at least in part on the entity that has or will initiate the particular action or type of action with the data.

Example D, the method of any of Examples A-C, further comprising: determining updated contextual information regarding performance of the particular action or type of action based at least in part on the entity that has or will initiate the particular action or type of action with the data, the contextual information, and the one or more data-handling requirements that are applicable to the request;

wherein the updating the contextual information includes updating the contextual information with the updated contextual information.

Example E, the method of any of Examples A-D, wherein the updated contextual information includes at least two of: function data indicating an action or a type of action that is or will be performed with the data in view of the performance of the particular action type of action; authority data indicating at least one of a jurisdiction or authority that is applicable to the data in view of performance of the particular action or type of action, a law that is applicable to the data in view of performance of the particular action or type of action, a regulation that is applicable to the data in view of performance of the particular action or type of action, a rule that is applicable to the data in view of performance of the particular action or type of action, a standard that is applicable to the data in view of performance of the particular action or type of action, or an industry practice or procedure that is applicable to the data in view of performance of the particular action or type of action; control data indicating a control on the data in view of performance of the particular action or type of action; class data indicating a class into which the data is classified in view of performance of the particular action or type of action; or history data indicating that the data has been involved with the particular action or type of action.

Example F, a system comprising: one or more processors; and memory communicatively coupled to the one or more processors and storing executable instructions that, when executed by the one or more processors, cause the one or more processors to perform operations comprising: identifying data; determining contextual information regarding handling of the data, the contextual information including at least two of: function data indicating an action or a type of action for which the data was acquired; authority data indicating at least one of a jurisdiction or authority that is applicable to the data, a law that is applicable to the data, a regulation that is applicable to the data, a rule that is applicable to the data, a standard that is applicable to the data, or an industry practice or procedure that is applicable to the data; control data indicating a control on the data; class data indicating at least one of a class for the authority data for the data, a class for a data subject to which the data is linked, a class regarding whether or not the data is sanitized or aggregated, or a class for a technology that was used to acquire the data; or history data indicating at least one of actions that the data has been involved with, who initiated the actions that the data has been involved with, how the data was acquired, or how the data has changed over time; receiving, from a requestor, a request regarding data-handling of the data; determining a response to the request based at least in part on the contextual information and one or more data-handling requirements that are applicable to the request; and sending the response to the requestor.

Example G, the system of Example F, wherein the operations further comprise: associating the contextual information with the data.

Example H, the system of any of Examples F or G, wherein the request specifies a particular action or type of action that will be performed with the data or has been performed with the data, the particular action or type of action including at least one of accessing, storing, manipulating, sharing, publishing, analyzing, archiving, marketing, targeting, selling, destroying, or transforming.

Example I, the system of any of Examples F-H, wherein the operations further comprise: determining an entity that has or will initiate the particular action or type of action with the data; wherein the determining the response includes determining the response based at least in part on the entity that has or will initiate the particular action or type of action with the data, the response indicating at least one of: whether or not the particular action or type of action can be performed in view of one or more data-handling requirements; or a task that needs to be performed to enable the particular action or type of action to be performed with the data, the task comprising at least one of transforming the data from one form to another form or obtaining authorization for performing the particular action or type of action with the data.

Example J, the system of any of Examples F-I, wherein the response indicates at least one of: the action or type of action for which the data was acquired; the one or more data-handling requirements that are applicable to the request; or information that is based on the history data included within the contextual information for the data.

Example K, the system of any of Examples F-J, wherein the operations further comprising: causing the data to be transformed from one form to another form to comply with the one or more data-handling requirements that are applicable to the request.

Example L, the system of any of Examples F-K, wherein the operations further comprise: determining that a particular action or type of action has been performed with the data; and updating the contextual information to reflect performance of the particular action or type of action.

Example M, the system of any of Examples F-L, wherein the updated contextual information includes at least two of: function data indicating an action or a type of action performed with the data in view of performance of the particular action or type of action; authority data indicating at least one of a jurisdiction or authority that is applicable to the data in view of performance of the particular action or type of action, a law that is applicable to the data in view of performance of the particular action or type of action, a regulation that is applicable to the data in view of performance of the particular action or type of action, a rule that is applicable to the data in view of performance of the particular action or type of action, a standard that is applicable to the data in view of performance of the particular action or type of action, or an industry practice or procedure that is applicable to the data in view of performance of the particular action or type of action; control data indicating a control on the data in view of performance of the particular action or type of action; class data indicating an information class into which the data is covered in view of performance of the particular action or type of action; or history data indicating that the data has been involved with the particular action or type of action.

Example N, one or more computer-readable storage media storing computer-executable instructions that, when executed by one or more processors, cause the one or more processors to perform acts comprising: receiving, from a requestor, a request regarding data-handling of data; retrieving contextual information regarding handling of the data; determining an entity that has or will initiate the data-handling of the data; determining a response to the request based at least in part on the contextual information and the entity that has or will initiate the data-handling of the data, the response indicating at least one of: an action or type of action for which the data was acquired; whether or not the data-handling indicated in the request can be performed by the entity with the data in view of one or more data-handling requirements that are applicable to the request; a task that needs to be performed to enable the data-handling to be performed by the entity with the data to comply with the one or more data-handling requirements that are applicable to the request; or the one or more data-handling requirements that are applicable to the request; and sending the response to the requestor.

Example O, the one or more computer-readable storage media of Example N, wherein the contextual information includes at least two of: function data indicating the action or the type of action for which the data was acquired; authority data indicating at least one of a jurisdiction or authority that is applicable to the data, a law that is applicable to the data, a regulation that is applicable to the data, a rule that is applicable to the data, a standard that is applicable to the data, or an industry practice or procedure that is applicable to the data; control data indicating a control on the data; class data indicating an information class associated with the data; or history data indicating at least one of actions that the data has been involved with, who initiated the actions that the data has been involved with, how the data was acquired, or how the data has changed over time.

Example P, the one or more computer-readable storage media of any of Examples N or O, wherein the operations further comprising: causing the data to be transformed from one form to another form to comply with the one or more data-handling requirements that are applicable to the request; and updating the contextual information to reflect the transformation of the data from the one form to the other form.

Example Q, the one or more computer-readable storage media of any of Examples N-P, wherein the operations further comprise: determining that a particular action or type of action has been performed with the data; and updating the contextual information to reflect performance of the particular action or type of action.

Example R, the one or more computer-readable storage media of any of Examples N-Q, wherein the updating the contextual information comprises updating history data included in the contextual information to indicate that the particular action or type of action was performed.

Example S, the one or more computer-readable storage media of any of Examples N-R, wherein the request comprises at least one of a request regarding a future use of the data, a request regarding a previous use of the data, or a request regarding what data-handling requirements apply to the data.

Example T, the one or more computer-readable storage media of any of Examples N-S, wherein the action or type of action includes at least one of accessing, storing, manipulating, sharing, publishing, analyzing, archiving, marketing, targeting, selling, destroying, or transforming Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A computer-implemented method, comprising:
   receiving data that has been acquired;
   determining contextual information regarding data-handling of the data;
   receiving, from a requestor, a request regarding the data-handling of the data, wherein the request asks for information regarding an action to be performed with respect to the data;
   determining a response to the request based at least in part on the contextual information associated with the action to be performed, the response comprising an additional action to be performed on the data in order to comply with one or more data-handling requirements; and
   providing the response to the requestor, the response providing guidance for an entity associated with the action to be performed, the guidance comprising instructions for handling the data, the instructions further including an indication of the additional action to be performed on the data in order to comply with the one or more data-handling requirements.

2. The method of claim 1, wherein the response indicates at least one of:
   whether the data-handling indicated in the request can be performed with the data in view of the one or more data-handling requirements; or
   a task that needs to be performed to enable the data-handling to be performed with the data to comply with the one or more data-handling requirements.

3. The method of claim 1, wherein the additional action includes one or more of anonymizing the data or converting telemetry data to profile data.

4. The method of claim 1, wherein the additional action includes converting the data from a first type of data to a second type of data.

5. The method of claim 1, wherein the contextual information further comprises function data indicating the action or a type of action for which the data was acquired.

6. The method of claim 1, wherein the contextual information further comprises authority data indicating at least one of a jurisdiction or authority that is applicable to the data, a law that is applicable to the data, a regulation that is applicable to the data, a rule that is applicable to the data, a standard that is applicable to the data, or an industry practice or procedure that is applicable to the data.

7. The method of claim 6, further comprising determining contextual information related to the data and tagging the data with the contextual information, wherein the authority data is part of the contextual information, and wherein the contextual information further comprises function data indicating the action or a type of action for which the data was acquired.

8. The method of claim 1, wherein the contextual information further comprises control data indicating at least one of a control on the data that is set for a device, a control on the data that is set by or on behalf of a data subject, a control on the data that is set by an entity, a control regarding a data-handling requirement for the data, a control regarding consent for the data, a choice mechanism control regarding a manner of obtaining the consent, or a choice control regarding a right to object to use of the data.

9. The method of claim 1, wherein the contextual information further comprises:
   class data indicating at least one of a class related to a data authority, a class related to the data subject or a device associated with the data subject, a class regarding whether or not the data is sanitized or aggregated, a class related to protected business information, a class related to national security, a class related to protection of Critical Infrastructure, or a class related to public health or safety; or
   history data indicating at least one of actions that the data has been involved with, who initiated actions that the data has been involved with, how the data was acquired, or how the data has changed over time.

10. A computer-implemented method comprising:
receiving data that has been acquired;
determining contextual information regarding data-handling of the data;
receiving, from a requestor, a request regarding the data-handling of the data, wherein the request asks for information regarding an action to be performed with respect to the data;
determining a response to the request based at least in part on the contextual information, the response comprising one or more data-handling requirements; and
providing the response to the requestor, the response providing guidance associated with the action to be performed, the guidance comprising instructions for handling the data in compliance with the one or more data-handling requirements;
determining that the action has been performed on the data; and
updating the contextual information based on performance of the action on the data.

11. The method of claim 10, wherein the response indicates at least one of:
whether the data-handling indicated in the request can be performed with the data in view of the one or more data-handling requirements; or
a task that needs to be performed to enable the data-handling to be performed with the data to comply with the one or more data-handling requirements.

12. The method of claim 10, wherein the contextual information further comprises function data indicating the action or a type of action for which the data was acquired.

13. The method of claim 10, wherein the contextual information further comprises authority data indicating at least one of a jurisdiction or authority that is applicable to the data, a law that is applicable to the data, a regulation that is applicable to the data, a rule that is applicable to the data, a standard that is applicable to the data, or an industry practice or procedure that is applicable to the data.

14. The method of claim 13, further comprising determining contextual information related to the data and tagging the data with the contextual information, wherein the authority data is part of the contextual information, and wherein the contextual information further comprises function data indicating the action or a type of action for which the data was acquired.

15. The method of claim 10, wherein the contextual information further comprises control data indicating at least one of a control on the data that is set for a device, a control on the data that is set by or on behalf of a data subject, a control on the data that is set by an entity, a control regarding a data-handling requirement for the data, a control regarding consent for the data, a choice mechanism control regarding a manner of obtaining the consent, or a choice control regarding a right to object to use of the data.

16. The method of claim 10, wherein the contextual information further comprises:
class data indicating at least one of a class related to a data authority, a class related to the data subject or a device associated with the data subject, a class regarding whether or not the data is sanitized or aggregated, a class related to protected business information, a class related to national security, a class related to protection of Critical Infrastructure, or a class related to public health or safety; or
history data indicating at least one of actions that the data has been involved with, who initiated actions that the data has been involved with, how the data was acquired, or how the data has changed over time.

17. The method of claim 10, wherein the updated contextual information further includes an indication of any new data-handling requirements that are applicable to the data after the action has been performed.

18. A system, comprising:
at least one processor;
memory in electronic communication with the at least one processor; and
instructions stored in the memory, the instructions being executable by the at least one processor to:
receive data that has been acquired;
determine contextual information regarding data-handling of the data;
receive, from a requestor, a request regarding the data-handling of the data, wherein the request asks for information regarding an action to be performed with respect to the data;
determine a response to the request based at least in part on the contextual information associated with the action to be performed, the response comprising an additional action to be performed on the data in order to comply with one or more data-handling requirements; and
provide the response to the requestor, the response providing guidance for an entity associated with the action to be performed, the guidance comprising instructions for handling the data, the instructions further including an indication of the additional action to be performed on the data in order to comply with the one or more data-handling requirements.

19. The system of claim 18, wherein the additional action includes one or more of anonymizing the data or converting the data from a first type of data to a second type of data.

20. The system of claim 18, wherein the contextual information further comprises function data indicating the action or a type of action for which the data was acquired.

* * * * *